United States Patent Office 3,242,111
Patented Mar. 22, 1966

3,242,111
COMPOSITIONS COMPRISING ALKYLOLATED ACRYLAMIDE INTERPOLYMERS AND EPOXY RESIN ESTERS CONTAINING HYDROXYL GROUPS
Francis W. Michelotti, Brooklyn, Alice W. Pucknat, New York, and Bernard H. Silverman, Maspeth, N.Y., assignors to Interchemical Corporation, New York, N.Y., a corporation of Ohio
No Drawing. Filed Aug. 31, 1962, Ser. No. 220,849
8 Claims. (Cl. 260—23)

This invention relates to resinous coating compositions based on esters derived from epoxide resins and alkylolated acrylamide copolymers and to coated articles made with such compositions.

It is known that various copolymers of acrylamide, when modified with aldehyde, have some properties valuable in appliance finishes and similar coatings, but such copolymers are deficient in flexibility for some of these applications.

It has now been found that the unsatisfactory flexibility of an aldehyde-modified acrylamide can be overcome by blending it with various esters derived from long chain aliphatic acids and epoxide resins. When these blends are formulated into coatings and thermoset, outstanding finishes are obtained, combining the desirable features of the alkylolated acrylamides with a decided improvement in flexibility. A combination of particular value has been found to be an interpolymer of 75 parts by weight of styrene, 15 parts by weight of acrylamide, 7 parts by weight of ethyl acrylate, and 3 parts by weight of methacrylic acid, the whole being methylolated and blended with any of a number of esters derived from long chain aliphatic acids or methacrylic acid and epoxide resins. In effect the esters act as reactive plasticizers for the copolymer. The detergent resistance of the blended cured coatings is excellent. The esters are really half esters, oxirane groups being absent but hydroxyl groups being present.

Alkylolation of the acrylamide copolymer can be conveniently carried out by simply adding an aldehyde solution, for example a solution of formaldehyde in butanol and a butanol-xylene solution of the copolymer are refluxed together for 3 to 4 hours, the water of condensation being removed azeotropically. Preferably two equivalents of formaldehyde are used for each amide group present in the copolymer, although this ratio may vary from one to three equivalents without seriously affecting the properties of the cured resin. Butylation takes place in the presence of butyl alcohol.

The quantity of ester blended with the aldehyde-modified acrylamide copolymer may be varied from 3% to 30% by weight, the optimum being 3% to 10%. The esters are preferably made from epoxide resins that are the reaction products of bisphenol and epichlorohydrin. Such resins having molecular weights ranging from 900–1050 up to 4800–8000 and melting points of 64–76° C. up to 145–155° C. are all suitable for making the esters. Examples of some of the phenolic compounds useful in conjunction with chlorohydrin for making epoxide resins are Bis(4-hydroxy-phenyl)-1,1-ethane
Bis(4-hydroxy-phenyl)-2,2-propane
Bis(4-hydroxy-phenyl)-2,2-butane
Bis(4-hydroxy-tertiary butyl phenyl)-2,2-propane Epichlorohydrin is generally used because of its economic advantage, but other epoxy compounds are otherwise suitable.

The acid constituent of the copolymer, methacrylic acid, serves as a mild catalyst. The copolymerization is preferably carried out in 1:1 butanol-xylene, although isopropanol, propanol, butyl cellosolve, or mixtures thereof may be used instead of butanol. Toluene or other high-boiling aromatic solvents may be substituted for xylene.

In the examples that follow, parts are parts by weight.

Example 1

180 parts acrylamide were dissolved in 600 parts butanol with the aid of heating and stirring. The inhibitor was filtered off. The filtrate was combined with 900 parts styrene, 84 parts ethyl acrylate, 36 parts methacrylic acid, 600 parts xylene, 12 parts cumene hydroperoxide, and 12 parts tertiary-dodecyl mercaptan and the mixture heated at reflux temperature for one hour. 12 parts more of tertiary-dodecyl mercaptan were then added. Heating at reflux temperature was continued for three additional hours. 6 parts of tertiary-butyl perbenzoate were added and heating continued for two hours more. 380 parts of a 40% solution of formaldehyde in butanol were added and the resulting mixture heated at reflux three hours, the water of reaction being removed as it was formed. The solids content was 47% by weight.

Example 2

A vehicle was made by blending 93 parts (on the basis of weight of resin solids) of the material prepared in Example 1 with 7 parts (solids basis) of the ester made by reacting 36 parts of "Epon 1004" in 40 parts xylene with 24 parts of dehydrated castor oil fatty acids, the fatty acids having an iodine value of 145–155, a saponification number of 193–200, and an acid number of 192–197. The material was about 41% esterified. A titanium dioxide pigment dispersion in this vehicle was made on a three-roll mill at a ratio of 40 pigment/60 vehicle. Applied as a one-coat system on 20–24 gauge steel and cured 30 minutes at 350° F., the final film thickness was about 1.4 mils. Coated panels were subjected to the usual tests. Detergent resistance was 9F at 72 hours, 6F at 144 hours, and 5F at 168 hours. Color and gloss were good. Conical mandrel test was F at 5/16", pencil hardness H, and reverse impact fair.

Example 3

A pigment dispersion was made as in Example 2 but the ester was derived from "Epon 1001" and lauric acid, only the epoxy groups being esterified. The tests were made on similar panels. Detergent resistance was 9F at 72 hours, 6F at 144 hours, and 5F at 168 hours. Conical mandrel was F at 5/16" and pencil hardness F. Color and gloss were good.

Example 4

Example 3 was repeated but using as epoxide ester 500 parts "Epon 1004" 50% esterified with 154 parts soya fatty acids. Detergent resistance was 9F at 72 hours, 7F at 144 hours, and 6MF at 168 hours. Color and gloss were good.

Example 5

Example 3 was repeated using as the ester 7% of a Solvesso #100 solution at 60% solids of 70% "Epon 1004" about 52% esterified with 30% 2-ethyl hexoic acid. Color and gloss were good. Conical mandrel test was F at 3/8" and pencil hardness H. Detergent resistance was 8F at 96 hours, 7F at 144 hours, and 5F at 168 hours.

Example 6

Example 3 was repeated, the ester being a 61% solids solution in Solvesso #100 of 70 parts "Epon 1004" 50% esterified with 30 parts pelargonic acid. Detergent resistance was the same as in Example 5. Conical mandrel was F at 3/8", pencil hardness F. Gloss and color were good.

Example 7

A mixture of 125 g. lauric acid, 375 g. Epon 1007, and 50 g. xylene was heated 7 hours at 232° C. After cooling it suitably, the batch was cut with 475 g. xylene while heating and stirring. The acid number was 0.31. The solids content was 50.9% and the degree of esterification was 41%.

Example 8

A mixture of 65 g. adipic acid, 150 g. isophthalic acid, 144 g. pelargonic acid, 31.5 g. vinylcyclohexene diepoxide, 63 g. neopentyl glycol, and 81 g. trimethylol ethane was heated under nitrogen to a temperature of about 165° C., which was then gradually increased to 235–240° C. over a 3-hour period (until clear). The batch was cooled to 170° C., after which 66 g. of xylene were added. Azeotropic distillation was then carried out until the acid number reached 9–10. The solids content was adjusted to 60% by adding a mixture of 227 g. butanol and 177 g. xylene.

Example 9

334 g. of the polyester of Example 8, 450 g. styrene, 42 g. ethyl acrylate, 18 g. methacrylic acid, 90 g. acrylamide, 300 g. butanol, 300 g. xylene, 9 g. tertiary-butyl perbenzoate, and 12 g. tertiary-dodecyl mercaptan were heated at reflux (120° C.) to form a mixture of polyester and interpolymer. The process was carried out as in Example 1; that is, initially ⅓ of the tertiary-butyl perbenzoate and ½ of the t-dodecyl mercaptan were withheld while the batch was refluxed for 1 hour. The withheld tertiary-dodecyl mercaptan was then added and refluxing continued for 3 hours. Finally the withheld tertiary-butyl perbenzoate was added and refluxing was continued 2 hours longer. The solids content was 48.7%. 421 g. of this mixture were heated for 3 hours with 65 g. of a 40% solution of formaldehyde in butanol, the water of reaction being removed as it was formed. The solids content was then 47.5%.

Example 10

A mixture of 150 g. isophthalic acid, 65 g. adipic acid, 144 g. pelargonic acid, 219 g. bis-2,2-(4-hydroxycyclohexyl)-propane, and 108 g. trimethylol ethane was heated under nitrogen to a temperature of 165–170° C., which was gradually increased to 235–240° C. over a 3-hour period (until clear). The batch was cooled to 170° C., after which 66 g. of xylene were added. Azeotropic distillation was then carried out until the acid number reached 9–10. The solids content was adjusted to 60% by addition of a mixture of 227 g. butanol and 177 g. xylene.

Example 11

The procedure of Example 9 was repeated, but using the polyester of Example 10 instead of the polyester of Example 8.

Example 12

A pigment dispersion was made as in Example 2, the vehicle being, however, 93 parts by weight of the polyester/methylolated butylated interpolymer mixture of Example 9 and 7 parts by weight of the condensation product of Example 7. Conical mandrel test was F at 5/16″, pencil hardness was F. Detergent resistance tests showed 9F at 72 hours, 7F at 144 hours, and 5F at 168 hours. Gloss and color were good.

Example 13

The procedure of Example 12 was repeated, but using 93 parts by weight of the polyester/methylolated butylated interpolymer mixture of Example 11, rather than that of Example 9. Tests showed F at 3/16″ with the conical mandrel, and a pencil hardness of F. Detergent tests showed practically the same resistance as in Example 12. Gloss and color were good.

Example 14

8.95 g. methacrylic acid and 0.30 g. N,N-dimethyl benzylamine were added to a mixture of 51 g. Epon 1001 and 0.03 g. hydroquinone, which was at a temperature of 110–116° C. The temperature was maintained at 116° C. until an acid number of 5–10 was attained. The batch was then cooled and dissolved in 40 g. of a 50–50 mixture of xylene and butanol.

Example 15

A mixture of 8.90 g. Cyclol and 24.7 g. xylene was heated to 80° C. and to it was added a mixture of 36.2 g. butyl acrylate, 2.14 g. methyl methacrylate, 2.14 g. methacrylic acid, and 24.7 g. xylene. The batch was heated 1½ hour at 80° C. and 1.0 g. lauroyl peroxide added. This temperature was maintained for 1½ hour, 0.25 g. more lauroyl peroxide added, and after another 1½ hour of heating, the temperature was raised to 125° C. and kept there 1 hour. The batch was cooled and drained off. The solids content was 42.6%.

Example 16

A mixture of 177 g. Novolac DEN 438, 200 g. lauric acid, and 1 g. triethylamine was heated to 150° C. for about 1 hour, cooled to 120–130° C. and maintained there until the acid number dropped to 2. The total heating time was about 4 hours.

A blend of 93 parts of the polyester/methylolated butylated interpolymer mixture of Example 9 and 7 parts of the ester of Example 7 was evaluated, the parts being parts by weight of solids. The blend was sprayed on a steel panel and baked 30 minutes at 350° F. The gloss, flexibility, hardness, and detergent resistance of the coating were all excellent. Equally good were coatings similarly made from blends of (a) 93 parts of the methylolated butylated polymer of Example 1 and 7 parts of the ester of Example 7, (b) 84 parts of the methylolated butylated polymer of Example 1, 7 parts of the polymer of Example 15, and 7 parts of the ester of Example 7, (c) 84 parts of the methylolated butylated polymer of Example 1, 7 parts of the polymer of Example 15, and 7 parts of the ester of Example 16, (d) 84 parts of the methylolated butylated polymer of Example 1, 7 parts of the polymer of Example 15, and 7 parts of the ester of Example 14, all parts being parts by weight of solid.

Novolac DEN 438 is an epoxide which may be represented by the formula

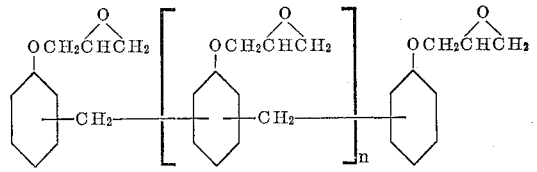

the average value for $n$ being 1.6.

It has a molecular weight of 650 and an epoxide functionality of approximately 3.6.

Cyclol is a 2-hydroxymethyl-5-norbornene and its structural formula is

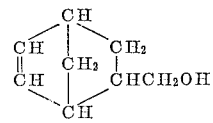

The epoxide compounds in these examples are polyglycidyl ethers of diphenols made by reacting bisphenols with epichlorohydrin. "Epon 1001" is such a compound and has an epoxide equivalent of about 450–525, a melting point of 64–76° C., and an esterification equivalent of 130. "Epon 1004" is similar but has an epoxide equivalent of 905–985, a melting point of 97–103° C., and an esterification equivalent of 175. "Epon 1007" is also similar but has an epoxide equivalent of 1600–1900, a melting point of 127–133° C., and an esterification equivalent of about 190. The bisphenol used in the above "Epons" is bis(4-hydroxyphenyl)-2,2-propane.

Solvesso #100 is a hydrocarbon solvent having a kauri-butanol value of 91–93, a boiling range of from 161–177° C. to 160–182° C. and an aniline point of 14.8–61.

The lauric acid used was a commercially pure grade consisting of 95% lauric acid, 3% myristic acid, and 2% capric acid.

Although in making the acrylamide copolymer cumene hydroperoxide and tertiary butyl perbenzoate are the preferred catalysts, other peroxygen catalysts may be used. Tertiary butyl hydroperoxide, cyclohexyl hydroperoxide, benzoyl peroxide, lauroyl peroxide, peracetic acid, and other similar compounds are suitable.

In the claims "parts" are parts by weight.

What is claimed is:

1. A thermosetting epoxide-free polymeric composition comprising (a) an epoxide-free hydroxy ester of an epoxide resin which is a polyglycidyl ether of a diphenol and an acid selected from the group consisting of a long chain fatty acid and methacrylic acid and (b) a butylated methylolated copolymer of about 75 parts of styrene, 15 parts of acrylamide, 7 parts of ethyl acrylate, and 3 parts of methacrylic acid, methylolation having been carried out by treatment with 1 to 3 equivalents of formaldehyde for each amide group present in the copolymer.

2. The composition of claim 1, in which the epoxide-free ester is made from (a) a polyglycidyl ether of a diphenol having an epoxide equivalent of from about 450 to about 1900, a melting point of from about 64–76° C. to about 127–133° C. and an esterification equivalent of from about 130 to about 190 and (b) an acid selected from the group consisting of lauric acid, pelargonic acid, 2-ethylhexoic acid, soya fatty acids, dehydrated castor oil fatty acids, and methacrylic acid.

3. A thermosetting epoxide-free polymeric composition comprising (a) about 7 parts of an epoxide-free hydroxy ester of a polyglycidyl ether of a diphenol having an epoxide equivalent of 1600–1900, a melting point of 127–133° C., and an esterification equivalent of about 190, and lauric acid and (b) about 93 parts of a homogeneous mixture of a methylolated butylated interpolymer and a polyester, said mixture consisting of (A) about 70 parts of a methylolated butylated interpolymer of styrene (75 parts), acrylamide (15 parts), ethyl acrylate (7 parts), and methacrylic acid (3 parts) and (B) about 23 parts of a polyester selected from the group consisting of (1) a polyester of about 65 parts of adipic acid, about 150 parts of isophthalic acid, about 144 parts of pelargonic acid, about 31.5 parts of vinyl cyclohexene diepoxide, about 63 parts of neopentyl glycol, and about 81 parts of trimethylol ethane and (2) a polyester of about 65 parts of adipic acid, about 150 parts of isophthalic acid, about 144 parts of pelargonic acid, about 219 parts of bis-2,2-(4-hydroxycyclohexyl)-propane, and about 108 parts of trimethylol ethane, the interpolymer having been prepared in the presence of said polyester and the resulting mixture having been methylolated and butylated.

4. A thermosetting epoxide-free polymeric composition comprising (a) about 84 parts of a butylated methylolated copolymer of about 75 parts of styrene, 15 parts of acrylamide, 7 parts of ethyl acrylate, and 3 parts of methacrylic acid, methylolation having been carried out by treatment with 1 to 3 equivalents of formaldehyde for each amide group present in the copolymer, (b) about 7 parts of a copolymer of about 36 parts of butyl acrylate, 9 parts 2-hydroxy-methyl-5-norbornene, 2 parts of methyl methacrylate, and 2 parts of methacrylic acid, and (c) about 7 parts of an epoxide-free ester selected from the group consisting of (1) hydroxy ester of a polyglycidyl ether of a diphenol having an epoxide equivalent of 1600–1900, a melting point of 127–133° C., and an esterification equivalent of about 190 and lauric acid, (2) a hydroxy ester of a polyglycidyl ether of a diphenol having an epoxide equivalent of 450–525, a melting point of 64–75° C., and an esterification equivalent of 175 and methacrylic acid, and (3) a hydroxy ester of a polyglycidyl ether of a diphenol represented by the formula

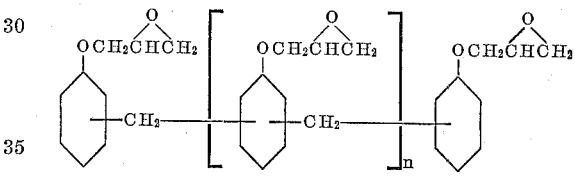

the average value for $n$ being 1.6, and lauric acid.

5. An article having a metallic surface coated with an adherent film of the cured composition of claim 1.

6. An article having a metallic surface coated with an adherent film of the cured composition of claim 2.

7. An article having a metallic surface coated with an adherent film of the cured composition of claim 3.

8. An article having a metallic surface coated with an adherent film of the cured composition of claim 4.

References Cited by the Examiner

UNITED STATES PATENTS

| | | | |
|---|---|---|---|
| 2,709,690 | 5/1955 | Narracott | 260—18 |
| 2,759,901 | 8/1956 | Greenlee | 260—18 |
| 2,940,945 | 6/1960 | Christenson et al. | 260—21 |
| 3,062,763 | 11/1962 | Gaylord | 260—45.4 |
| 3,156,740 | 11/1964 | Bussell | 260—834 |

LEON J. BERCOVITZ, *Primary Examiner.*

DONALD E. CZAJA, *Examiner.*